United States Patent
McLennan et al.

(10) Patent No.: US 9,272,594 B2
(45) Date of Patent: Mar. 1, 2016

(54) SYSTEM AND METHOD OF USING AIR SUSPENSION TO IMPROVE VEHICLE UNLOADING

(71) Applicant: Continental Automotive Systems, Inc., Auburn Hills, MI (US)

(72) Inventors: Trevor B McLennan, Amherstburg (CA); Kent R Young, Grand Blanc, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 102 days.

(21) Appl. No.: 14/081,272

(22) Filed: Nov. 15, 2013

(65) Prior Publication Data

US 2015/0137463 A1    May 21, 2015

(51) Int. Cl.
*B60G 17/015* (2006.01)
*B60G 17/016* (2006.01)
*B60G 17/017* (2006.01)
*B60G 17/052* (2006.01)

(52) U.S. Cl.
CPC .......... *B60G 17/0155* (2013.01); *B60G 17/016* (2013.01); *B60G 17/017* (2013.01); *B60G 17/052* (2013.01); *B60G 2202/152* (2013.01); *B60G 2300/024* (2013.01); *B60G 2300/04* (2013.01); *B60G 2300/38* (2013.01); *B60G 2400/252* (2013.01); *B60G 2500/322* (2013.01); *B60G 2500/324* (2013.01); *B60G 2600/20* (2013.01); *B60G 2800/014* (2013.01); *B60G 2800/203* (2013.01); *B60G 2800/205* (2013.01)

(58) Field of Classification Search
CPC ............. B60G 17/0155; B60G 17/017; B60G 17/016; B60G 2300/38; B60G 2202/152; B60G 2500/30; B60G 17/052; B60G 2300/024; B60G 2600/20; B60G 2400/252; B60G 2500/322; B60G 2800/014; B60G 2300/04; B60G 2500/324; B60G 2800/203; B60G 2800/205
See application file for complete search history.

(56) References Cited

U.S. PATENT DOCUMENTS

| | | | | |
|---|---|---|---|---|
| 4,396,202 A | * | 8/1983 | Kami et al. ................ | 280/6.157 |
| 5,452,919 A | * | 9/1995 | Hoyle et al. ............... | 280/5.514 |
| 2011/0035104 A1 | * | 2/2011 | Smith ............................ | 701/37 |

* cited by examiner

*Primary Examiner* — Drew Brown

(57) ABSTRACT

An aft suspension system for a pickup truck comprises four corner assemblies, where one corner assembly is located at a suspension position corresponding to each of the wheel corners for the vehicle. An air supply unit includes a reservoir, a compressor, and an ECU is fluidly connected to the corner assemblies. The air supply unit is capable of independently adjusting the corner assemblies from one another. The air suspension system is operable to place the corner assemblies in a unloading position or a trailer, which corresponds to two of the corner assemblies in raised positions and the other of the two corner assemblies located in lowered positions to create a maximum height differential between the front and rear corner assemblies.

10 Claims, 3 Drawing Sheets

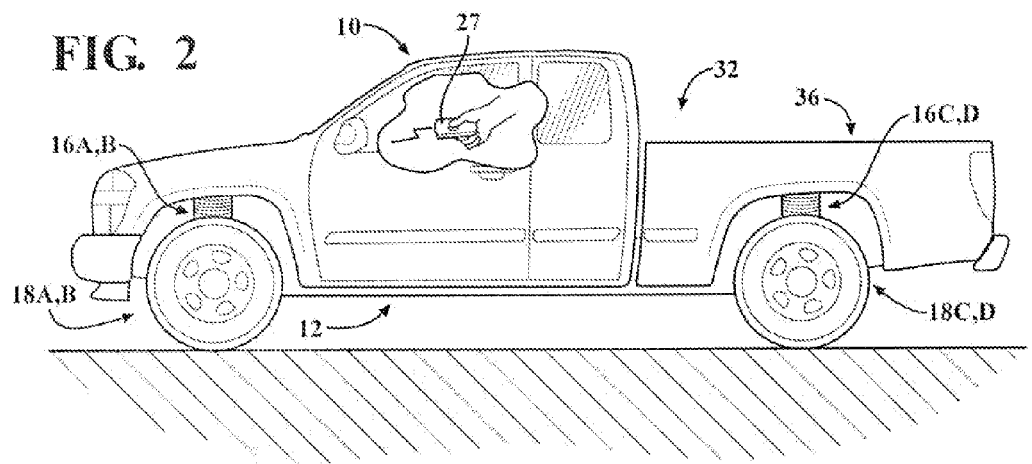
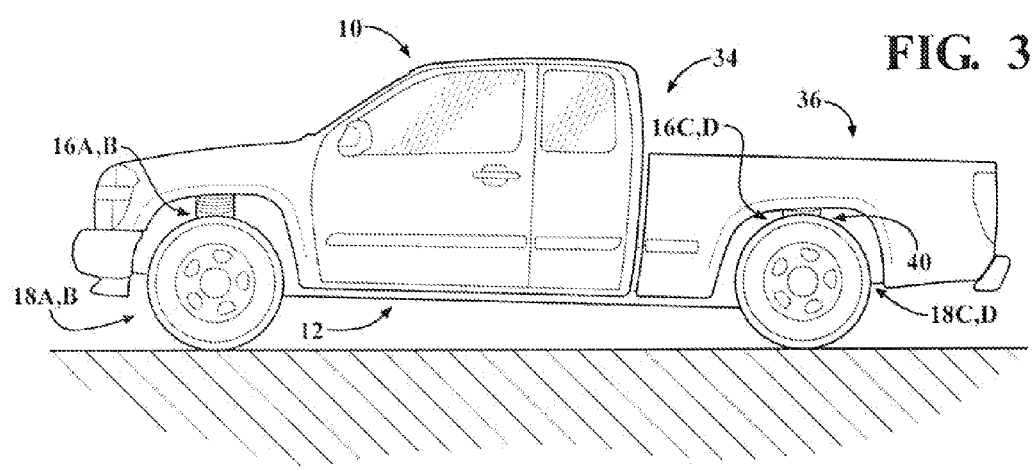
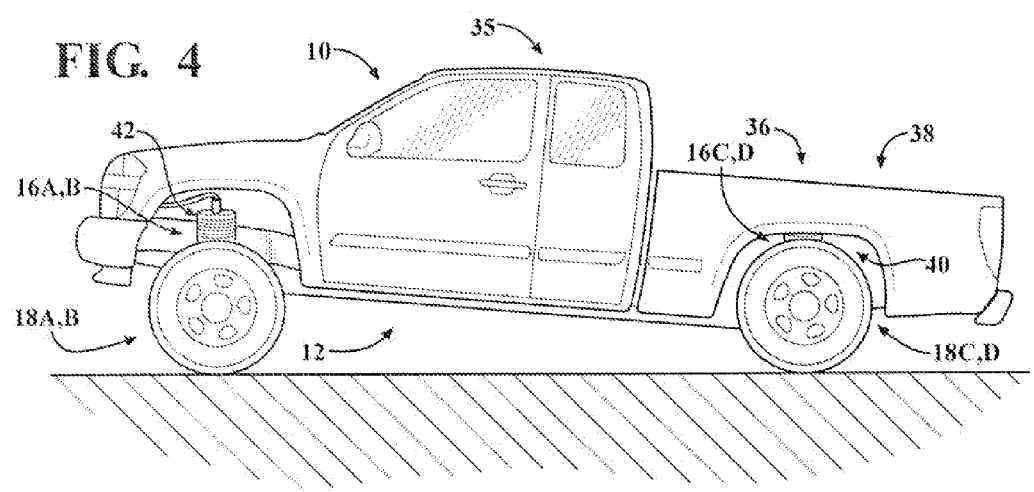

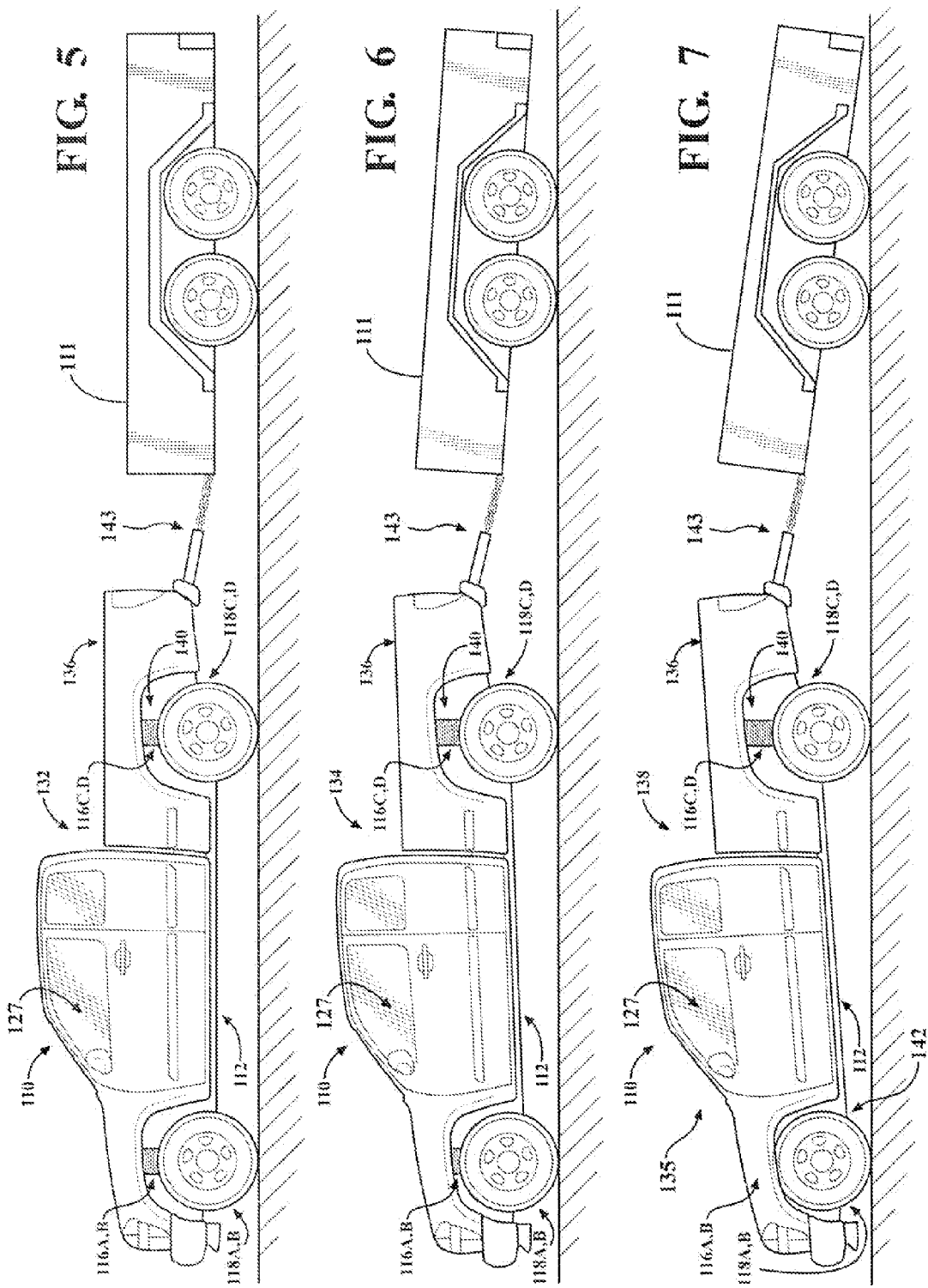

SYSTEM AND METHOD OF USING AIR SUSPENSION TO IMPROVE VEHICLE UNLOADING

TECHNICAL FIELD

The present disclosure relates to automotive vehicles and more particularly to suspension systems for automotive vehicles.

BACKGROUND

Suspension systems for automotive vehicles provide vehicle passengers with a more comfortable ride. Demand from vehicle owners for more controls and options has led to the development of adjustable air suspension systems. Depending on the current driving surface, different suspension operating modes may be selected by the vehicle operator. The suspension operating modes have present suspension parameters to provide the ideal suspension arrangement for various driving situations. Typical operating modes a driver may select include, a standard driving mode, a parking mode, an off-roading mode, etc, In addition to providing selected operating modes for various driving situations the suspension system may be adjusted when select operating conditions are met. For example the vehicle height may be lowered when operating above a predetermined operating speed to obtain a better aerodynamic profile for the vehicle. Thus, adjustable air suspension systems provide a vehicle operator with a more efficient driving experience.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An air suspension system for a passenger vehicle comprises four corner assemblies, where one corner assembly is located at a suspension position corresponding to each of the wheel corners for the vehicle. An air supply unit includes an ECU, a reservoir, a compressor, and a valve block fluidly connected to the corner assemblies. The air supply unit is capable of independently adjusting the corner assemblies from one another. The air suspension system is operable to place the corner assemblies in a unloading position, which corresponds to two of the corner assemblies located at positions corresponding to the front wheel corners of the vehicle in raised positions and the other of the two corner assemblies located at positions corresponding to the rear wheel corners of the vehicle in lowered positions.

An air suspension system for a vehicle comprises at least two corner assemblies. An air supply unit including a reservoir, a compressor, and an ECU is fluidly connected to the corner assemblies. The air supply unit is capable of independently adjusting the corner assemblies. The air suspension system is operable to place the corner assemblies in an unloading position corresponding to one of the two corner assemblies in a raised position and the other of the two corner assemblies in a lowered position.

A method of adjusting an air suspension system comprises detecting with an electronic control unit for the air suspension system that a unloading mode has been selected. Air supply within the air suspension system is controlled with the electronic control unit to a first two corner assemblies for the air suspension system to lowered positions and a second two corner assemblies for the air suspension system to raised positions.

An air suspension system for a passenger vehicle comprises four corner assemblies, where one corner assembly is located at a suspension position corresponding to each of the wheel corners for the vehicle. An air supply unit includes an ECU, a reservoir, a compressor, and a valve block fluidly connected to the corner assemblies. The air supply unit is capable of independently adjusting the corner assemblies from one another. The air suspension system is operable to place the corner assemblies in a trailer unloading position, which corresponds to two of the corner assemblies located at positions corresponding to the front wheel corners of the vehicle in lowered positions and the other of the two corner assemblies located at positions corresponding to the rear wheel corners of the vehicle in raised positions, such that a trailer hitched to the vehicle is moved to the trailer unloading position.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a schematic illustration of the pickup truck having the air suspension system of FIG. 1 in a first position;

FIG. 3 is a schematic illustration of the pickup truck having the air suspension system of FIG. 1 in a second position;

FIG. 4 is a schematic illustration of the pickup truck having the air suspension system of FIG. 1 in a third position;

FIG. 5 is a schematic illustration of a trailer and the pickup truck having the air suspension system of FIG. 1 in the first position;

FIG. 6 is a schematic illustration of the trailer and the pickup truck having the air suspension system of FIG. 1 in a fourth position; and FIG. 7 is a schematic illustration of the trailer and the pickup truck having the air pension system of FIG. 1 in a fifth position.

DETAILED DESCRIPTION

Figure 1:
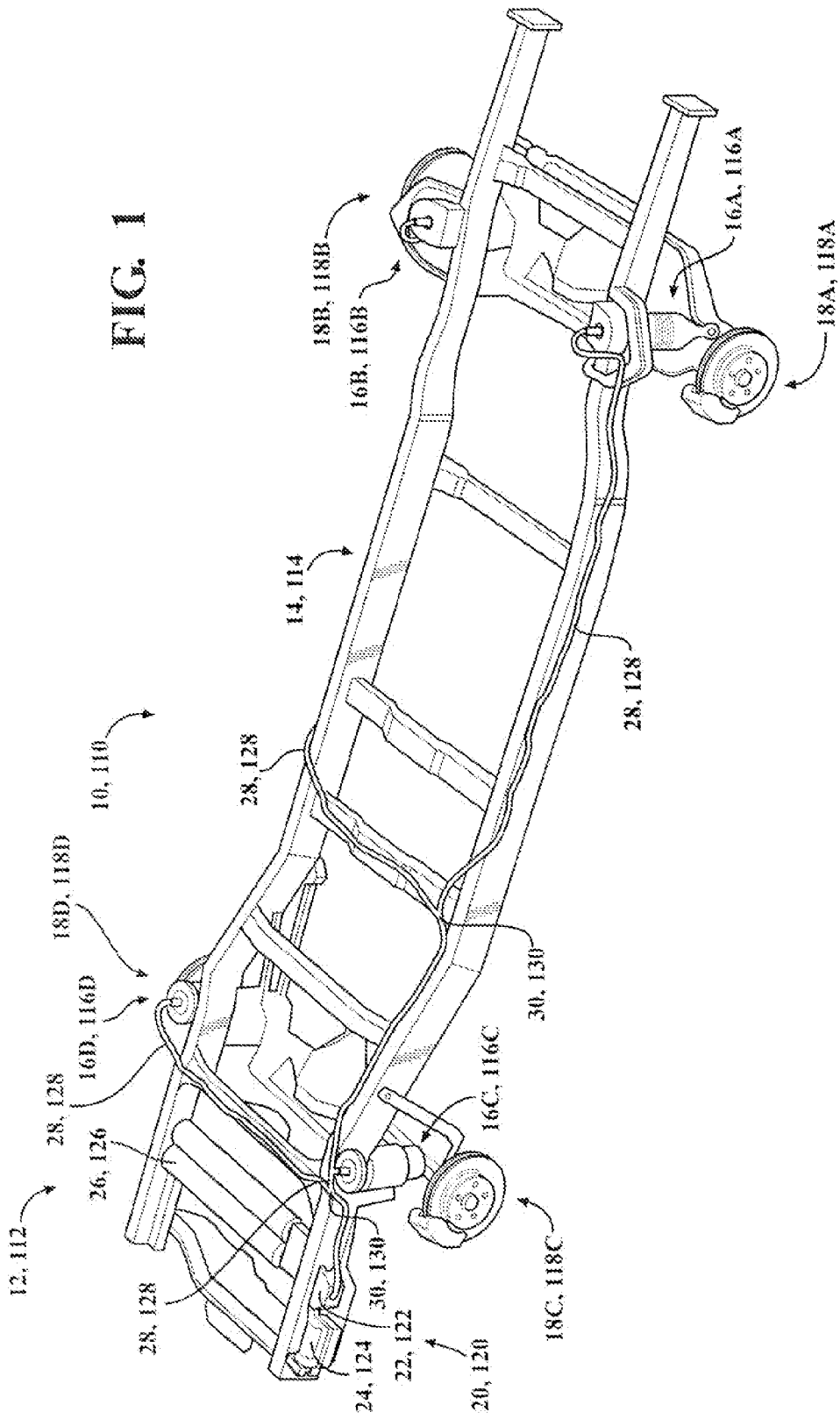
FIG. 1 is a schematic illustration of a frame for pickup truck having an air suspension system of the present invention.

The following description is merely exemplary in nature and is in no way intended to limit the disclosure, its application or uses. For purposes of clarity, the same reference numbers will be used in the drawings to identify similar elements. FIG. 1 illustrates a vehicle, a pickup truck, 10 having an air suspension system 12. The air suspension system 12 is supported by a frame 14. The air suspensions system has four corner assemblies 16A-D located at each of the wheel 18 locations of the vehicle 10. The four corner assemblies 16A-D may be independently adjustable. Two corner assemblies 16A, B are located at the front wheel 18A, B corners of the vehicle 10 and two corner assemblies 16C, D are located at the rear wheel 18C, D corners of the vehicle.

The air suspension system 12 includes an air supply unit 20 fluidly connected to the four corner assemblies 16A-D. The air supply unit 20 includes an electronic control unit 22, a compressor 24, a reservoir 26 and a valve block 30 The individual components of the air supply unit may be assembled together or supported on the vehicle at separate locations. In the embodiment shown the ECU 22 is located remote from the compressor 24, reservoir 26 and valve block 30. The individual components of the air supply unit 20 may be assembled together or supported on the vehicle 10 at separate locations. In the embodiment shown, the ECU 22 is located remote from the compressor 24, reservoir 26 and valve block 30 (electrical connections not shown). The air supply unit 20 is connected to the four corner assemblies 16A-D through the supply lines 28. In the example shown, the air suspension system 12 is a closed system. The valve block 30 is controlled by the ECU 22 to regulate the air supply between the compressor 24, the reservoir 26 and the four corner assemblies 16A-D. The valve block 30 may be a single unit defining multiple valves, multiple valves located together, or multiple valves at different locations. Additionally, the reservoir 26 may be a single or multiple tank assembly.

The four corner assemblies 16A-D are capable of moving independently from one another to provide load leveling for the vehicle 10. The four corner assemblies 16A-D are also adjustable to accommodate various driving conditions. The suspension mode is controlled through a selector 27 adjustable by an operator of the vehicle 10. Based upon the selected suspension mode the ECU 22 will regulate the air supply between the compressor 24, reservoir 26 and the four corner assemblies 16A-D to adjust the four corner assemblies 16A-D from the current positions to the desired positions. When lowering any of the corner assemblies 16A-D the excess air is sent to the reservoir 26 for storage. When raising any of the corner assemblies 16A-D the required air is sent from the reservoir 26 to the appropriate corner assembly 16A-D. The compressor 24 ensures that the air pressure within the system 12 is maintained at the desired level. Alternately, in the instance of an open system the excess air is released to the environment or pulled from the environment and pressurized as needed. The compressor 24 ensures that the air pressure within the system 12 is maintained at the desired level.

The air suspension system 12 is adjusted at the direction of the vehicle operator, by moving the selector 27, or when pre-determined operating conditions exist, e.g. the vehicle 10 accelerates above a certain speed and the suspension system 12 is lowered, when the vehicle 10 decelerates below a pre-determined threshold the suspension system 12 raised. Therefore, the air suspension system 12 may be adjusted while the vehicle 10 is in motion. In this instance, the front corner assemblies 16A, B may be adjustable together and the rear corner assemblies 16C, D may be adjustable together. To provide the most aerodynamic adjustment possible, when the vehicle is travelling in a forward direction, the rear corner assemblies are adjusted to the new position first when the suspension system 12 is raised. However, when the suspension system 12 is lowered, the front corner assemblies 16A, B are adjusted to the new position first. Alternately, each corner 16A-D could be adjusted separately or all corners 116A-D could be adjusted simultaneously.

FIGS. 2-4 are a schematic illustration of a pickup truck 10 with the air suspension system 12. FIG. 2 illustrates the pickup truck in a first position 32. In the first position 32, the air suspension system 12 is in a parked vehicle position. A vehicle operator may move the selector 27, located on a knob in the vehicle 10, a HMI interface, or as a button on a key fob, to select and unloading mode, shown at 35. The unloading mode 35 may be used to assist in removing a load from the bed 36 of the pickup truck 10. When the vehicle operator selects the unloading mode, 35, the vehicle 10 moves the pickup truck 10 to an unloading position 38.

Moving the pickup truck 10 to the unloading position 38 is a two step process. The front corner assemblies 16A, B are moved together and the rear corner assemblies 16C, D are moved together. FIG. 3 illustrates the pickup truck 10 in a second position 34 which is an intermediate position in which, only two of the corner assemblies 16A-D have moved from the first position 32. In FIG. 3, the rear corner assemblies 16C, D have move to a lowered position 40. The lowered position of the rear corner assemblies 16C, D may be the lowest point of travel that the rear corner assemblies 16C, D are capable of moving. FIG. 3 illustrates the intermediate position 34 as having the rear corner assemblies moved to the lowered position 40 and the front corner assemblies 16A, B in the first position 32. However, the intermediate position 34 may have the front corner assemblies in a raised position 42 and the rear corner assemblies 16C, D in the first position 32.

FIG. 4 illustrates the pickup truck 10 in the third position 38, which is the unloading position. In the unloading position 38 the rear corner assemblies 16C, D are in the lowered position 40 and the front corner assemblies 16A, B are in the raised position 42. The raised position 42 of the front corner assemblies 16A, B may be the highest point of travel that the front corner assemblies 16A, B are capable of moving. The unloading position 38 provides the greatest distance in height from the front of the bed 36 to the rear of the bed 36. The difference in height allows gravity to assist in removing objects from the pick-up bed 36. The unloading position 38 is intended to utilize the variation in height that the air suspension system 12 is capable of providing to assist in unloading the pick-up truck bed 36.

Alternatively, the unloading position 38 may be used by vehicles 10 other than a pickup truck, which utilize a four-corner air suspension system 12, as disclosed herein. Also, the unloading mode, shown at 35, may be initiated by the selector 27. The selector 27 may be a knob or interface located in the vehicle 10 which is used by the vehicle operator to select the other suspension modes and/or may be a button located on the key fob for the vehicle 10 as the unloading suspension mode 35 is likely to be initiated and used when someone is outside of the vehicle 10.

The above embodiment disclose two-axle pickup truck 10 having four wheels 18A-D. However, the air suspension system 12 may be used with a pickup truck 10 having more than one wheel 18A-D located at each corner. One corner assembly 16A-D would be associated with each wheel 18A-D location, regardless of how many wheels are at each location.

Referring to FIGS. 1-4 one embodiment of a method of adjusting an air suspension system is described. The ECU 22 detects that an unloading mode 35 has been selected with the selector 27. For suspension modes that are initiated under predetermined vehicle 10 operating conditions sensors may be used to sense when the operating conditions are present for the applicable operating mode of the air suspension system 12. The ECU 22 may receive data from the other sensors (not shown) to detect these conditions. Ride height sensors 29 are used to sense the suspension travel at each corner, at each axle, or a combination thereof.

The ECU 22 detects that an unloading mode 25 has been selected the ECU 22 controls the air supply within the air suspension system 12 to move the two rear corner assemblies 16C, D to the lowered positions 40 and the two front corner to the raised positions 42 The ECU 22 directs air from the rear corner assemblies 16C, D to the fluid reservoir 26 to move the two rear corner assemblies 16C, D to the lowered positions 40 by controlling the valve block 30 to direct the fluid within the rear corner assemblies 16C, D and fluid lines 28. The ECU 22 also directs air from the fluid reservoir 26 to the front corner assemblies 16A, B to move the two front corner assemblies 16A, B to the raised positions 42 by controlling the valve block 30. The front corner assemblies 16A, B move independently of the rear corner assemblies 16C, D. The ECU 22 may control the air supply unit 20 to complete movement of one end of the air suspensions system 12 prior to moving the other end of the air suspension system 12. For example, the rear corner assemblies 16C, D may be moved to the lowered positions 40 prior to controlling the air supply to move front corner assemblies 16A, B to the raised positions 42. Operation of the compressor 24 is also controlled by the ECU 22 to maintain air pressure within the air suspension system 12 at a desired level. Adjusting pressure within the system 12 may also be used to assist in controlling air flow to the desired location. Controlling air flow may include adjusting the pressure within the system 12 to maintain position as weight is removed in the unloading process.

FIG. 5 illustrates a pick-up truck 110 having a trailer 111 secured to the pick-up truck 110 for towing. The pick-up truck 110 has the same suspension 112 as illustrated in FIGS. 2-4. The suspension 112 is supported on a frame 114 and has four corner assemblies 116A-D at each of the wheels 118A-D. The air suspension system 112 includes air supply unit 120 fluidly connected to the four corner assemblies 116A-D. The air supply unit 120 may include an electronic control unit 122, a compressor 124, a reservoir 126 and a valve block 130. The individual components of the air supply unit 120 may be assembled together or supported on the vehicle 110 at separate locations. In the embodiment shown, the ECU 122 is located remote from the compressor 124, reservoir 126 and valve block 130 (electrical connections not shown). The air supply unit 120 is connected to the corner assemblies 116A-D through the supply lines 128. In the example shown, the air suspension system 112 is a closed system. The valve block 130 is controlled by the ECU 122 to regulate the air supply between the compressor 124, the reservoir 126 and the corner assemblies 116A-D. The valve block 130 may be a single unit defining multiple valves, multiple valves located together, or multiple valves at different locations. Additionally, the reservoir 126 may be a single or multiple tank assembly.

The four corner assemblies 116A-D are capable of moving independently from one another to provide load leveling for the vehicle 110. The four corner assemblies 116A-D are also adjustable to accommodate various driving conditions. The suspension mode is controlled through a selector 127 adjustable by an operator of the vehicle 110. Based upon the selected suspension mode the ECU 122 will regulate the air supply between the compressor 124, reservoir 126 and the corner assemblies 116A-D to adjust the corner assemblies 116A-D from the current positions to the desired positions. When lowering any of the corner assemblies 16A-D the excess air is sent to the reservoir 26 for storage. When raising any of the corner assemblies 116A-D the required air is sent from the reservoir 126 to the appropriate corner assembly 116A-D. The compressor 124 ensures that the air pressure within the system 112 is maintained at the desired level. Alternately, in the instance of an open system the excess air is released to the environment or pulled from the environment and pressurized as needed. The compressor 124 ensures that the air pressure within the system 112 is maintained at the desired level.

The air suspension system 112 is adjusted at the direction of the vehicle operator, by moving the selector 127, or when pre-determined operating conditions exist. Therefore, the air suspension system 112 may be adjusted while the vehicle 10 is in motion. In this instance, the front corner assemblies 16A, B may be adjustable together and the rear corner assemblies 16C, D may be adjustable together. To provide the most aerodynamic adjustment possible, when the vehicle is travelling in a forward direction, the rear corner assemblies are adjusted to the new position first when the suspension system 12 is raised. However, when the suspension system 12 is lowered, the front corner assemblies 16A, B are adjusted to the new position first. Alternately, each corner 16A-D could be adjusted separately or all corners 116A-D could be adjusted simultaneously.

FIGS. 5-7 are a schematic illustration of the pickup truck 110 with the air suspension system 112 and a connected trailer 111. FIG. 5 illustrates the pickup truck 110 in a first position 132. In the first position 132, the air suspension system 112 is in a parked vehicle position. A vehicle operator may move the selector 127, located on a knob in the vehicle 110, a HMI interface, or as a button on a key fob, to select a trailer unloading mode, shown at 135. The trailer unloading mode 135 may be used to assist in removing a load from the trailer 111 hitched to the pickup truck 110 or adding a load to the trailer 111. When the vehicle operator selects the trailer unloading mode 135, the vehicle 110 moves the pickup truck 110 to a trailer unloading position 138.

Moving the pickup truck 110 to the trailer unloading position 138 is a two step process. The front corner assemblies 116A, B are moved together and the rear corner assemblies 116C, D are moved together. FIG. 6 illustrates the pickup truck 110 in a fourth position 134 which is an intermediate position in which, only two of the corner assemblies 116A-D have moved from the first position 132. In FIG. 6, the rear corner assemblies 116C, D have move to a raised position 140. The raised position 140 of the rear corner assemblies 116C, D may be the highest point of travel that the rear corner assemblies 116C, D are capable of moving. FIG. 6 illustrates the intermediate position 134 as having the rear corner assemblies 116C, D moved to the raised position 140 and the front corner assemblies 116A, B in the first position 132. However, the intermediate position 134 may have the front corner assemblies in a lowered position 142 and the rear corner assemblies 116C, D in the first position 132.

FIG. 7 illustrates the pickup truck 110 in the third position 138, which is the trailer unloading position 138. In the trailer unloading position 138 the rear corner assemblies 116C, D are in the raised position 140 and the front corner assemblies 116A, B are in the lowered position 142. The lowered position 142 of the front corner assemblies 116A, B may be the lowest point of travel that the front corner assemblies 116A, B are capable of moving. As the front of the vehicle 110 lowers and the rear of the vehicle 110 is raised the trailer 111 pivots at the hitch 143 that secures the trailer 111 to the vehicle 110. The trailer 111 is, thus, moved into the trailer unloading position 138. The trailer unloading position 138 provides the greatest distance in height from the front of the trailer 111 to the rear of the trailer 111. The difference in height allows gravity to assist in removing objects from the trailer 111. The trailer unloading position 138 is intended to utilize the variation height that the air suspension system 112 is capable of providing to assist in unloading the trailer 111. The trailer unloading position 138 may be used by any vehicle 110 which utilizes a four-corner air suspension system 112, as disclosed herein, and have a trailer 111 hitched to the vehicle 110.

The above embodiment discloses a two-axle pickup truck 110 having four wheels 118A-D. However, the air suspension system 112 may be used with any vehicle including a pickup truck 110 having more than one wheel 118A-D located at each corner. One corner assembly 116A-D would be associated with each wheel 118A-D location, regardless of how many wheels are at each location.

Referring to FIGS. 1 and 5-7 one embodiment of a method of adjusting an air suspension system 112 is described. The ECU 122 detects that a trailer unloading mode 135 has been selected with the selector 127. The ECU 122 controls the air supply within the air suspension system 112 to move the two rear corner assemblies 116C, D to the raised positions 140 and the two front corner to the lowered positions 142. The ECU 122 directs air toward the rear corner assemblies 116C, D from the fluid reservoir 126 to move the two rear corner assemblies 116C, D to the raised positions 140 by controlling the valve, block 130. The ECU 122 also directs air to the fluid reservoir 126 from the front corner assemblies 116A, B to move the front corner assemblies 116A, B to the lowered positions 142 by controlling the valve block 130. The front corner assemblies 116A, B move independently of the rear corner assemblies 116C, D. The ECU 122 may control the air supply unit 120 to complete movement of one end of the air suspensions system 112 prior to moving the other end of the air suspension system 112. For example, the rear corner assemblies 116C, D may be moved to the raised positions 140 prior to controlling the air supply unit 120 to move front corner assemblies 116A, B to the lowered positions 142. Operation of the compressor 124 is also controlled by the ECU 122 to maintain air pressure within the air suspension system 112 at a desired level. Adjusting pressure within the system 112 may also be used to assist in controlling air flow to the desired location. Controlling air flow may include adjusting the pressure within the system 12 to maintain position as weight is removed in the unloading process.

In the above embodiment, illustrated in FIGS. 1 and 5-7 an unloading mode 135 for the vehicle 110 and trailer 111 assembly. In another embodiment, the unloading mode for the vehicle 110 and trailer 111 assembly can also be used to provide a trailer loading mode. By moving the trailer 111 to the third position 138 the trailer 111 has a decreased distance between the rear of the trailer bed and the ground. The decreased distance would create a lower loading angle, which may be especially important when loading the trailer using ramps, e.g. recreation vehicles, wheeled equipment, or heavy items.

Therefore, FIGS. 1-7 illustrate several embodiments of providing an unloading mode 35, 135 using a vehicle 10, 110 equipped with an air suspension system 12, 112. By moving the corner assemblies 16A-D, 116A-D to the relative travel extremity the height differential created between the front and rear wheels 18A-D, 118A-D may be utilized. In all embodiments the adjustment of the air suspension system 12, 112 to the third position may be controlled by the operator or by an algorithm within the ECU 22, 122. Further, the amount of adjustment may also be decided by the operator or the algorithm. Therefore, adjustment of the air suspension system 12, 112 can be stopped at any point in travel of the corner assemblies 16A-D, 116A-D, not only at the extremity of travel.

In all figures, the distance of travel and the resulting movement and height differential may be exaggerated to clearly illustrate the difference in the vehicle 10, 110 and trade 111 positions produced by the movement of the air suspension 12, 112 in the different operating modes.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. An air suspension system for a passenger vehicle comprising:
    at least four corner assemblies, two of the corner assemblies in a front end and two of the corner assemblies in a rear end;
    an air supply unit including an ECU, a reservoir, a compressor, and a valve block fluidly connected to the four corner assemblies, wherein the air supply unit is capable of independently adjusting the four corner assemblies; and
    wherein the air suspension system is operable to place the four corner assemblies in an unloading mode corresponding to the front corner assemblies in a raised position and the rear corner assemblies in a lowered position, and wherein the air suspension system is operable to place the four corner assemblies in a trailer unloading mode with the front corner assemblies in a lowered position and the rear corner assemblies in a raised position; and
    wherein the air pressure can be adjusted to maintain a position of the vehicle as weight is removed in one of said modes.

2. The air suspension system of claim 1, wherein the electronic control unit is controllably connected to valves within fluid lines of the air suspension system to control air supply to control the air supply between the reservoir for the air suspension system and the corner assemblies.

3. The air suspension system of claim 2, the compressor is fluidly connected to the reservoir to maintain a desired fluid pressure within the air suspension system, and wherein operation of the compressor is controlled by the electronic control unit.

4. The air suspension system of claim 1, wherein the air suspension system is one of a closed system and an open system.

5. The air suspension system of claim 1, wherein the raised position corresponds to the furthest point the corresponding suspension corner may be raised and wherein the lowered position corresponds to the lowest position the corresponding suspension corner may be lowered.

6. The air suspension system of claim 1, wherein the unloading mode can be selected by one of a selector in the vehicle and a button on a key fob.

7. The air suspension system of claim 1, wherein the trailer unloading mode has a lower angle between the ground and the rear of the trailer than a normal operating mode, such that the trailer unloading mode can be used to load an object on the vehicle.

8. A suspension system as described in claim 1 wherein when said vehicle accelerates above a certain speed in the forward direction the suspension system is lowered by first lowering the front corner assemblies and then the rear corner assemblies and when the vehicle decelerates below a predefined threshold the rear corner assemblies are first raised and the front assemblies are then raised.

9. A method of adjusting an air suspension system for a vehicle comprising:
    detecting with an electronic control unit for the air suspension system that one of an unloading mode and trailer unloading mode has been selected;
    controlling air supply within the air suspension system to move two front corner assemblies upward for an unloading mode and downward for a trailer unloading mode and moving two rear corner assemblies downward for an unloading mode and upward for a trailer unloading mode; and adjusting the air pressure in the corner assemblies to maintain a position of the vehicle as weight is removed in one of said modes.

10. A method of adjusting an air suspension system for a vehicle described in claim 9 further comprising:

lowering the vehicle when the vehicle accelerates forward above a predefined speed by first lowering the front corner assemblies and then lowering the rear corner assemblies and raising the vehicle when the vehicle decelerates below a certain threshold by first raising the rear corner assemblies and then raising the front corner assemblies.

* * * * *